UNITED STATES PATENT OFFICE.

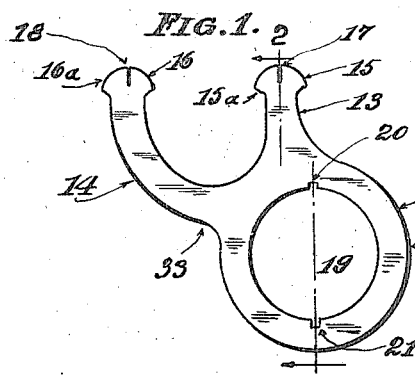
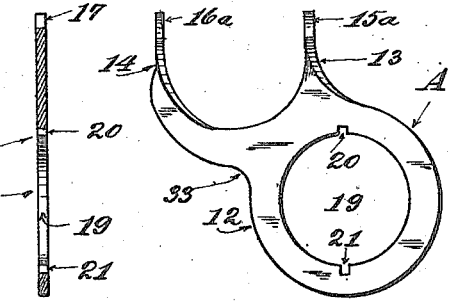
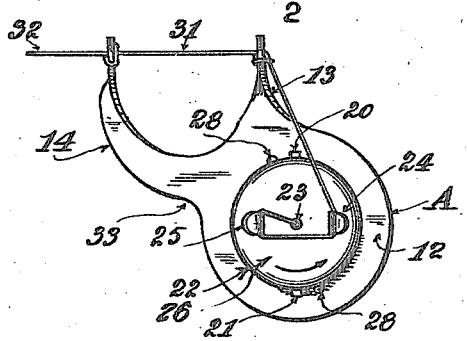
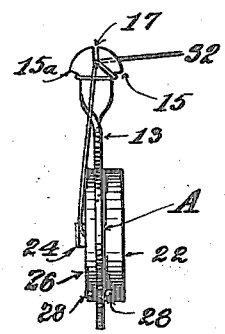
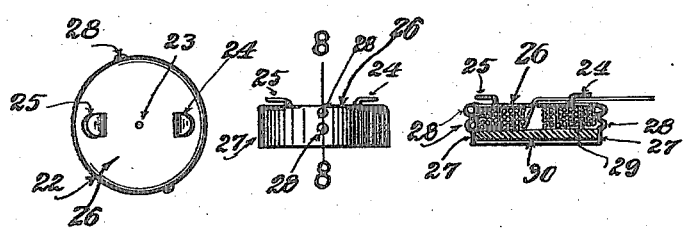
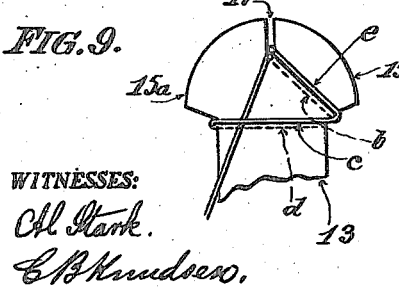
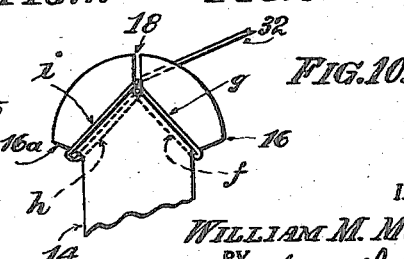

WILLIAM MARK MUCHOW, OF EVANSTON, ILLINOIS.

TOOTH-CLEANING INSTRUMENT.

1,233,687.　　　　　Specification of Letters Patent.　　Patented July 17, 1917.

Application filed March 3, 1917. Serial No. 152,235.

*To all whom it may concern:*

Be it known that I, WILLIAM MARK MU-CHOW, a citizen of the United States, and a resident of the city of Evanston, in the county of Cook and State of Illinois, have invented a certain new and useful Improvement in Tooth-Cleaning Instruments; and I do hereby declare that the following description of my said invention, taken in connection with the accompanying sheet of drawing, forms a full, clear, and exact specification, which will enable others skilled in the art to which it appertains to make and use the same.

My invention relates generally to improvements in tooth cleaning instruments, and it consists, essentially, in the novel and peculiar combination of parts and details of construction, as hereinafter first fully set forth and described and then pointed out in the claims.

The object of this present invention is the production of an efficient, serviceable, durable, and comparatively inexpensive instrument for effectively cleaning the teeth of human beings.

A further object of this invention is the production of a tooth cleaning instrument that shall be highly sanitary, and that shall be usable without the slightest danger of injuring a person's gums or teeth.

In order to accomplish these desirable results, I construct my present device, in the preferred embodiment of my invention, as shown in the drawings, which form a part of this specification, and illustrate the invention quite fully. In these drawings, Figure 1 is a plan view of my tooth cleaning instrument, showing the same in the first stage of its manufacture. Fig. 2 is a sectional view on line 2—2 of Fig. 1. Fig. 3 is a plan view similar to Fig. 1, illustrating the second stage of manufacture of this device. Fig. 4 is a plan view showing the device complete ready for use. Fig. 5 is an edge view of the same. Fig. 6 is a plan view of the floss container employed in connection with this instrument. Fig. 7 is a side view of the same, and Fig. 8 is a sectional view on line 8—8 of Fig. 7. Figs. 9 and 10 are diagrammatic illustrations on a magnified scale of the upper portions of the arms and lobes, showing how the dental floss or thread is trained over the arms and lobes of this device.

A, in these drawings indicates the body portion of this instrument. This body portion is produced, preferably, from a flat and comparatively thin sheet of non-metallic material or substance, in the process of punching with suitable dies, which material, in its natural condition, is quite hard and but slightly flexible, but which when subjected to proper treatment, can be bent, and which will afterward resume its hardness and thereby permanently retain the newly acquired condition or shape. Such material or substance may be hard rubber, celluloid, and other similar and well-known substances.

The body A comprises an annular ring 12, from which emanates approximately radially, an arm 13; and substantially at right angles therefrom there is a second, curved, arm 14, both of these arms terminating in laterally extending lobes 15, 15$^a$, 16, 16$^a$, the lobes on each arm being separated from each other by a narrow slit 17, 18, respectively.

In the annular ring 12 there is an opening 19, and there is in this opening, if desired, a notch 20, and there may be a second notch 21, preferably diametrically opposed to the notch 20, the object of which will farther on appear.

While this body A, in the condition described, is ample and perfectly capable of being used for the purpose indicated, I prefer to twist the arms 13, 14, as shown in Figs. 3, 4, and 5, so that the planes of the lobes are in parallelism, and the slits 17, 18, therein in alinement, which construction lends itself best to the training or stringing of the dental floss over the arms and lobes as I shall hereinafter fully explain.

The dental floss employed in this instrument is a well-known article of commerce, sold in a small container; and for the purpose of my present instrument, I construct this container, shown in detail in Figs. 6, 7, and 8, of a cup-shaped receptacle 22, in the bottom 26 of which there is, preferably centrally, a small opening 23, and oppositely located on said bottom, there are two, outwardly extending lugs 24, 25, which lugs are preferably right-angled bent portions punched out of the bottom 26. These lugs, owing to their being punched out of the bottom, have very sharp lower edges, which are adapted to serve as cutters, so that the floss, when passed around one or the other of these lugs, may be readily severed by pulling on the strand or thread of floss. These lugs also perform the function of handles for the container in a manner which will hereinafter appear.

In the rim 27 of the cup 22 there are outwardly pressed teats or projections 28; and in the cup 22 there is placed a coil of floss 29, which coil is preferably so wound as to unwind from the center thereof, and it is retained in position by a, preferably heavy, card board cover 30, it being understood that the container after having been emptied, is not generally designed for being re-used, it being, as a matter of fact, so cheaply produced as to render its refilling impractical.

The thread of floss is trained over the arms and lobes in a peculiar manner which is diagrammatically illustrated in Figs. 9 and 10. Thus the thread issuing from the central opening in the container is first passed behind one of the lugs 24, 25, and then crossed over behind the opposing lug, as shown in Fig. 4, and then passed through the slit 17 in the arm 13, behind the lobe 15, obliquely downward underneath the lobe 15, as at $b$ in Fig. 9. Thence the strand is crossed over to the opposite lobe 15$^a$, as at $c$, thence horizontally behind the arm 13 back to the first lobe 15$^a$, as at $d$, and thence in front of the arm obliquely upward as at $e$, and through the slit 17 to the opposite slit 18 in the arm 14. Here the floss is first passed obliquely downward on the back of the lobe 16, as at $f$, thence around the lobe 16 upward in front of the arm 14, as at $g$, through the slit 18, thence obliquely downward as at $h$, to, and around the opposite lobe 16$^a$, and finally upwardly, as at $i$, through the slit 18. In this manner the floss is so securely fastened to the arms that pressure applied to the stretch 31, Fig. 4, of the floss, fails to slacken this stretch, while when pulling on the free end 32, of the floss, the same will readily unwind from the arms, the used-up portion cut off by one of the lugs 24, 25, and another length of thread pulled out of the container, which new length will be trained over the arms in the manner above described.

As heretofore stated, the container of the floss is located in the annular opening 19 in the body A. It is inserted therein with the projections 28 passed through the notches 20, 21, and then slightly rotated in either the direction indicated by an arrow in Fig. 4, or in the contrary direction, either of which will then hold the container in position.

Attention is now directed to the shoulder 33 at the junction of the arm 14 with the ring 12. This shoulder serves the purpose of a stop, so that the instrument when placed in the mouth of a person, rests against the upper, or the lower lip, as the case may be, and is thus in correct position for use, resting the arm 14 on the lower or the upper teeth. Thus a person biting on the instrument, forces the strand 31 between adjacent teeth, and by working the jaw of the person up and down, effects, in a short time, a thorough cleansing of these teeth. And it may be here noted that a person when using this instrument soon acquires such an expert and sensitive manipulation of the device that injury to the mouth or the teeth will be an impossibility. The apparatus being non-metallic, it cannot injure the teeth, and can always be kept in a perfectly sanitary condition. But I desire here to state that while the non-metallic construction is by far the most desirable one, metallic construction of the body A might be employed by persons to whom the health of the user is of no importance; and I do not, therefore, wish to confine myself exclusively to the employment of non-metallic material in the construction of this device.

The lugs 24, 25, afford convenient handles by which the container 22 may be rotated in, and lifted out of, the opening 19 when its removal becomes necessary. And it may here be noted that this container, when in proper position, affords a natural and most convenient means for holding the device between the thumb and the first finger of a person's hand.

I have hereinbefore described the preferred embodiment of my invention, but I desire it to be distinctly understood that changes in the details of construction may be made without departing from the scope of my invention as defined in the subjoined claims.

Having thus fully described this invention, I claim as new, and desire to secure to myself by Letters Patent of the United States—

1. As an improved article of manufacture, a body for a tooth cleaner, said body comprising an annular ring, an arm on said ring a second arm on said ring, said second arm being curved, said arms having on their terminals sidewise extending lobes, said lobes being centrally and vertically slitted, said body being of uniform thickness throughout.

2. As an improved article of manufacture, a body for a tooth cleaner, said body comprising an annular ring, an arm on said ring, a second arm on said ring, said second arm being curved, said arms having at their terminals sidewise extending lobes, said lobes being centrally and vertically slitted, said body being of uniform thickness throughout, said arms being twisted, said lobes being in parallelism, said slits being alined.

3. As an improved article of manufacture, a tooth cleaning instrument, said instrument including a body comprising an annular ring, an arm on said ring, a second arm on said ring, said second arm being curved, said arm having a shoulder at its junction with said ring, sidewise extending lobes at the extremities of said arms, said arms being twisted, said lobes being alined, the flanks or sides of said lobes being in parallelism, there being a slit at the end of said arms, said slits being in alinement, and a container, said container being removably located in the opening of said ring and projecting from both faces of said body.

4. As an improved article of manufacture, a tooth cleaning instrument, said instrument including a body comprising an annular ring, an arm on said ring, a second arm on said ring, said second arm being curved, sidewise extending lobes at the extremities of said arms, said arms being twisted, said lobes being in parallelism, there being a slit at each end of said arms, and a container in the opening of said ring and projecting from both sides thereof, there being on said container outwardly extending lugs, said container being supplied with thread, said thread being trained over said lugs and around said lobes.

5. As an improved article of manufacture, a tooth cleaning instrument, comprising an annular ring, arms projecting from said ring, each of said arms being twisted and having laterally projecting lobes, said lobes being in parallelism, there being at the end of each arm a slit, and a thread trained over said arms, said thread being placed into the slit of one arm, then turned obliquely downward on the back of said arm, behind one lobe, to the front thereof, then horizontally in front of said arm to the opposite lobe, then horizontally on the back of said arm to the first-mentioned lobe, and then in front of said arm to, and through the slit therein to the second arm, thence on the back of said second arm obliquely to and around one of said lobes, thence in front of the latter arm upwardly back and through said second slit, thence downwardly behind the second lobe to the front of said arm and then back to and again through said second slit.

In testimony that I claim the foregoing as my invention, I have hereunto set my hand.

WILLIAM MARK MUCHOW.